(12) United States Patent
Wushour (10) Patent No.: US 12,025,960 B2
(45) Date of Patent: Jul. 2, 2024

(54) INTEGRATION OF PRINTING DEVICE TO A SMART SPACE

(71) Applicant: KYOCERA Document Solutions Inc., Osaka (JP)

(72) Inventor: Dilinur Wushour, Clayton, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 823 days.

(21) Appl. No.: 17/165,202

(22) Filed: Feb. 2, 2021

(65) Prior Publication Data
US 2022/0244683 A1 Aug. 4, 2022

(51) Int. Cl.
| | |
|---|---|
| G05B 13/00 | (2006.01) |
| G05B 13/02 | (2006.01) |
| G06N 5/043 | (2023.01) |
| G06Q 10/02 | (2012.01) |
| G06Q 10/1093 | (2023.01) |
| G06V 30/40 | (2022.01) |
| G06K 15/00 | (2006.01) |
| G06V 30/10 | (2022.01) |

(52) U.S. Cl.
CPC ......... *G05B 13/0265* (2013.01); *G06N 5/043* (2013.01); *G06Q 10/02* (2013.01); *G06Q 10/1095* (2013.01); *G06V 30/40* (2022.01); *G06K 15/402* (2013.01); *G06V 30/10* (2022.01)

(58) Field of Classification Search
CPC .................................................. G06Q 10/1095
See application file for complete search history.

(56) References Cited

U.S. PATENT DOCUMENTS

| | | | | |
|---|---|---|---|---|
| 8,466,790 | B2 | 6/2013 | Palin et al. | |
| 9,032,215 | B2 | 5/2015 | Kalofonos et al. | |
| 10,904,401 | B2* | 1/2021 | Cho | H04N 1/2392 |
| 11,327,696 | B2* | 5/2022 | Sugimoto | G06F 3/1204 |
| 2007/0150512 | A1 | 6/2007 | Kong et al. | |
| 2009/0143910 | A1* | 6/2009 | Seo | B41J 13/106 |
| | | | | 901/1 |
| 2013/0174059 | A1* | 7/2013 | Van Wie | G06F 3/0484 |
| | | | | 715/757 |
| 2014/0368870 | A1* | 12/2014 | Moritani | G06K 15/002 |
| | | | | 358/1.15 |
| 2015/0029544 | A1* | 1/2015 | Yun | G06F 3/126 |
| | | | | 358/1.15 |

(Continued)

*Primary Examiner* — Benjamin O Dulaney
(74) *Attorney, Agent, or Firm* — W. Eric Webostad (57) ABSTRACT

Systems and methods relate generally to integration of a printing device to a smart space meeting room ("meeting room"). In an example, a virtual assistant: receives a request to schedule a meeting; obtains a list of attendees; determines availability of attendees and the meeting room; confirms the availability of the attendees; reserves the meeting room; sends invitations to each of the attendees; generates a query for searching a content management system on a server; and locates materials on the content management system for the meeting. The server loads the materials for the meeting from the content management system and sends the materials to the printing device. A bot of the printing device checks status of the printing device. The printing device prints the materials personalized to each of the attendees. The virtual assistant requests the printed materials to be picked up by a robot for delivery to the meeting room.

20 Claims, 7 Drawing Sheets

(56) References Cited

U.S. PATENT DOCUMENTS

| | | | |
|---|---|---|---|
| 2015/0039357 A1* | 2/2015 | Segal | G06Q 10/06314 |
| | | | 705/5 |
| 2018/0077100 A1* | 3/2018 | Sama | G06F 9/542 |
| 2018/0104816 A1* | 4/2018 | Tokuchi | B25J 9/1679 |
| 2018/0267963 A1* | 9/2018 | Ogata | G06Q 30/0269 |
| 2020/0050408 A1* | 2/2020 | Wushour | G06Q 10/083 |
| 2021/0124539 A1* | 4/2021 | Matysiak | G06F 3/1294 |
| 2021/0168261 A1* | 6/2021 | Nakamura | H04N 1/32507 |
| 2022/0101834 A1* | 3/2022 | Chen | G10L 15/1822 |
| 2022/0229889 A1* | 7/2022 | Matysiak | G07C 9/30 |

* cited by examiner

INTEGRATION OF PRINTING DEVICE TO A SMART SPACE

FIELD

The following description relates to printing devices. More particularly, the following description relates to integration of a printing device to a smart space.

BACKGROUND

Generally, a "smart space" is a physical or digital environment in which humans and technological systems interact to provide open, interconnected, coordinated and intelligent ecosystems. A smart space may combine multiple groups, such as for example people, processes, services and things, into a single platform. This combination is to provide a collaborative, immersive and automated experience. In facilitating smart spaces to continue developing as individual technologies emerge allowing more collaborative and interactive environments, an intuitive user interface framework for non-expert users may be used to accelerate digital transformation.

SUMMARY

In accordance with one or more below described examples, a method relating generally to integration of a printing device to a smart space meeting room is disclosed. In such a method, a virtual assistant of a user device receives a request to schedule a meeting. The virtual assistant obtains a list of attendees. The virtual assistant determines availability of both attendees on the list of attendees and the smart space meeting room. The virtual assistant confirms the availability of the attendees. The virtual assistant reserves the smart space meeting room. The virtual assistant sends invitations to each of the attendees. The virtual assistant generates a query for searching a content management system on a server. The virtual assistant locates materials on the content management system for the meeting. The server loads the materials for the meeting from the content management system. The server sends the materials to the printing device. A bot of the printing device checks status of the printing device. The printing device prints the materials personalized to each of the attendees. The virtual assistant requests the printed materials to be picked up by a robot for delivery to the smart space meeting room reserved for the meeting.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

As previously indicated, smart device integration in a smart space may be used to provide a collaborative, immersive and automated experience. As described below, a printing device is integrated with a virtual assistant, a server, and a smart space meeting room to enhance such an experience with respect to using printed materials.

With the above general understanding borne in mind, various configurations for systems, and methods therefor, with smart space printing device integrated capabilities are generally described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Figure 1:
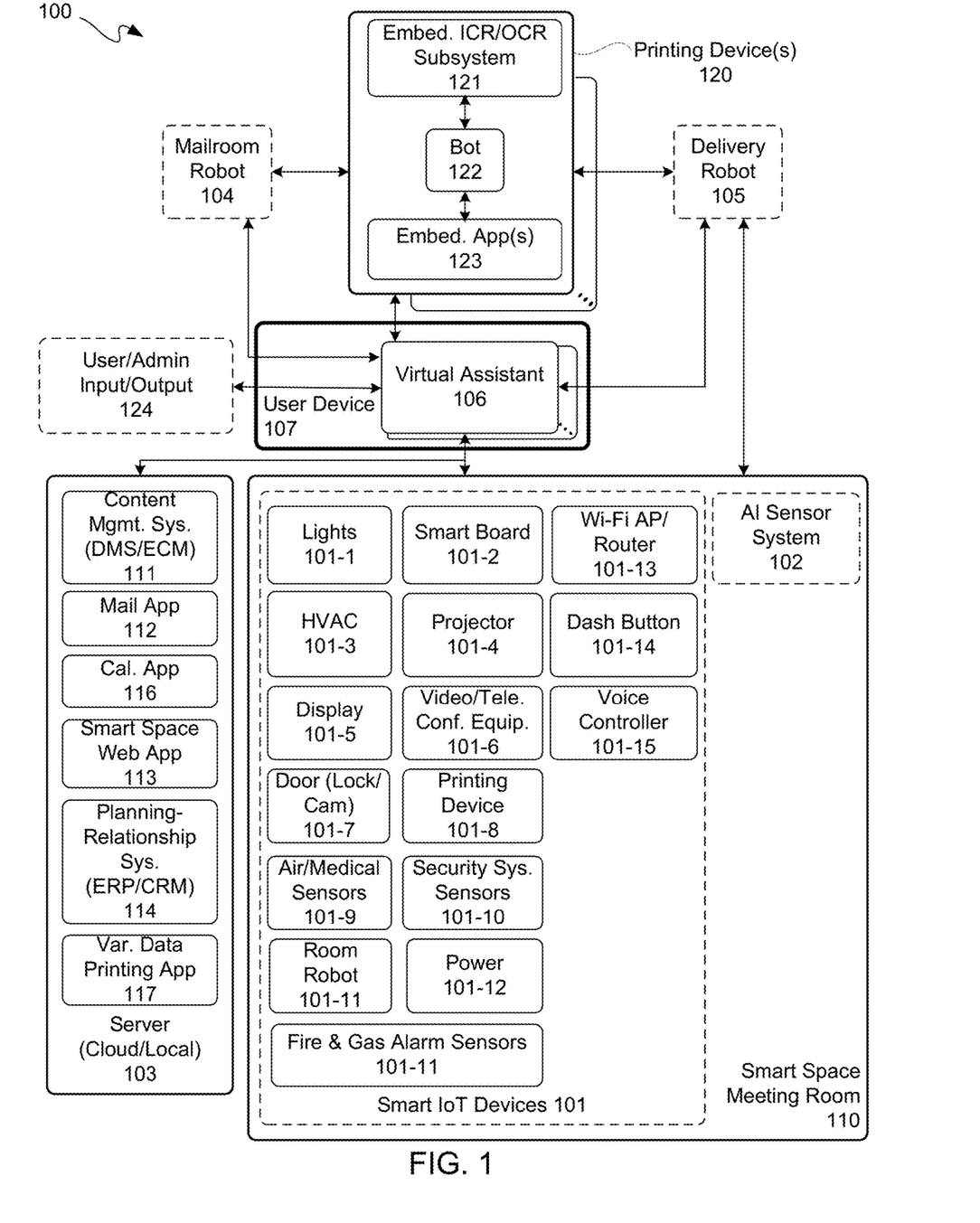
FIG. 1 is a block diagram depicting an example of a smart space collaboration platform.

FIG. 1 is a block diagram depicting an example of a smart space collaboration platform 100. Smart space collaboration platform 100 includes one or more printing devices 120, a user device 107, a server 103, and a smart space meeting room 110. Optionally, smart space collaboration platform 100 may further include a mailroom robot 104 and a delivery robot 105. Communication interconnections are generally depicted throughout FIG. 1, and such communication interconnections may be wired channels, over-the-air channels, or a combination thereof.

A printing device 120, which in this example is a multi-function printer ("MFP") for purposes of clarity by way of example and not limitation, includes a bot 122 in communication with embedded optical and intelligent character recognition ("OCR/ICR") subsystem 121 and embedded apps of MFP 120. An optional mailroom robot 104 may be in communication and physically coupled to MFP 120 for processing mail. Additionally, an optional delivery robot 105 may be in communication and physically coupled to MFP 120 for delivering printed materials.

User or admin input/output ("input/output") 124 may be provided to/from a one or more user devices 107, or more particularly to/from one or more corresponding virtual assistants 106 thereof. Such input may be by keyboard, cursor pointing device, audio and/or visual communication. In this example, user device 107 may be a smart phone, a tablet, a notebook computer, or other Wi-Fi able or other wireless communication protocol able device. However, in another example, user device 107 may be a smart speaker. For purposes of clarity by way of example and not limitation, input/output 124 may be for an initiator and/or one or more attendees.

Virtual assistant 106 may be in communication with MFP 120, optional mailroom robot 104, and optional delivery robot 105. Virtual assistant 106 may be in communication with server 103 and smart space meeting room 110, or more particularly components thereof as described below in additional detail.

Virtual assistant 106 may be software installed or otherwise incorporated into user device 107, such as for example Apple Siri, Amazon Alexa, Microsoft Cortana, Microsoft Briana, or Google Assistant. A virtual assistant 106 may be an intelligent personal assistant, human language interface, automation and voice recognition software for a Windows-based, Android-based, iOS-based, Fire-base, or other based operating system ("OS"). In this example, virtual assistant 106 is a multi-functional artificial intelligence (AI) software allowing interaction with a computer using voice commands. However, in another example, a virtual or smart assistant 106 may be software installed in a smart speaker for a user device 107. Accordingly, a virtual assistant 106 is meant to include an intelligent personal assistant device and/or software.

Virtual assistant 106 can perform tasks or services or answer questions. Virtual assistant 106, and thus user device 107, may be in communication with one or more printing devices 120, server 103, and smart space meeting room 110, and/or other devices of smart space collaboration platform 100. Along those lines, virtual assistant 106 of user device 107 may be in communication with optional mailroom robot 104 and delivery robot 105, both of which are assumed to be in smart space collaboration platform 100 for purposes of clarity by way of example and not limitation.

A smart space is a physical and/or digital environment in which humans and technology-enabled systems interact often in open, interconnected, coordinated and intelligent ecosystems. A smart space generally combines multiple elements of a business, such as for example people, processes, services and things, into a single platform for a more collaborative, immersive and automated experience. Smart spaces are developing as individual technologies emerge from silos to work together to create a collaborative and interaction environment. It is anticipated that smart spaces will accelerate digital transformation.

Smart space meeting room 110, which in this example is a physical room, but in another example may be a virtual room, includes a plurality of smart Internet-of-Things ("IoT") devices 101. Such smart IoT devices 101 may include interfaces for wireless communication over a web or other network. In this example, smart IoT devices 101 are Wi-Fi devices; however, in other examples, this and/or another communication protocol may be used.

Smart IoT devices 101 may include one or more lights 101-1, smart boards 101-2, HVAC 101-3, projectors 101-4, displays 101-5, video/telephone conference equip. 101-6, smart door (e.g., peephole camera, lock), room printing devices 101-8, air quality/medical sensors 101-9, security system sensors 101-10, room robot 101-11, AC/DC power 101-12, Wi-Fi access point ("AP")/router 101-13, dash button 101-14, and/or voice controller 101-15. Smart IoT devices 101, which may communicate over a web with one another, as well as with user devices brought into smart space meeting room 110, may form a collaboration platform within an organization to communicate, share content and work together on projects. Some of these smart IoT devices 101 may be accessible tools by multiple user devices at any time, furthering a smart space as a digital experience not confined to the boundary of a single computer or smartphone.

Smart space meeting room 110 is not limited to a device managed by cloud computing though a cloud-managed device may be a component. Rather, smart space meeting room 110 may include a number of autonomous "things", such as robots, drones and/or vehicles, working together intelligently. In general, devices collaborating with each other and with humans may be used to automate processes and solve problems.

Along those lines, collaborating with one or more smart IoT devices 101 may be an AI sensor system 102 having one or more AI sensors. An AI sensor system 102 may make human-like decisions or conduct human-like operations. For example, an AI sensor system 102 may coordinates emails, upcoming events and to-do lists with recently used applications and documents as well as corporate communications. For example, an AI sensor system 102 may provide easy access to a presentation for a project team to work on alongside a relevant company announcement.

AI sensor system 102 capabilities may add real time and contextual intelligence to centralize assets into a single interface. An AI sensor system 102 may work with a printing device 120, such as an MPF for example, to be incorporated into a part of an organization's processes.

An AI sensor system 102 may be web-based or web-capable to be accessed on multiple devices and support flexible working initiatives. Along those lines, employees may avoid having to use multiple applications and sift through large amounts of data.

With digital devices and cloud operations, collaboration may be enhanced. Because workers already share most of what they work with, incorporating company-wide digital assistants may provide a more seamless experience. For a business, usage analytics becomes available across all spaces, providing full visibility into most and least used meeting rooms, to guide facilities investment and configuration such as furniture and other resources. Lights can be dimmed, devices put to sleep and HVAC adjusted according to actual presence or absence of users, reducing waste and operating expense.

Smart device integration may involve interconnecting printers, bots, PCs, smart phones, virtual reality systems ("VRs"), virtual personal assistants, cars, lights, power systems, and delivery robots, among other devices. Smart device integration may involve software integration. Software integration may involve interoperability among active directories ("ADs"), email systems, calendaring systems, shared folders, cloud storage systems, document management systems/enterprise content management systems ("DMSs/ECM systems"), and/or variable data printing apps, among others resources.

Server 103 may be a local server or a cloud-based server. Server 103 may be in communication with resources of smart space meeting room 110 and virtual assistant 106. Server 103 may include a content management system 111 (e.g., DMS/ECM system), a mail app 112, a calendar app 116, a smart space web app 113, a planning-relationship (e.g., an enterprise resource planning/customer relationship management ("ERP/CRM")) system 114, and/or a variable data printing app 117, among other resources.

Figure 2:
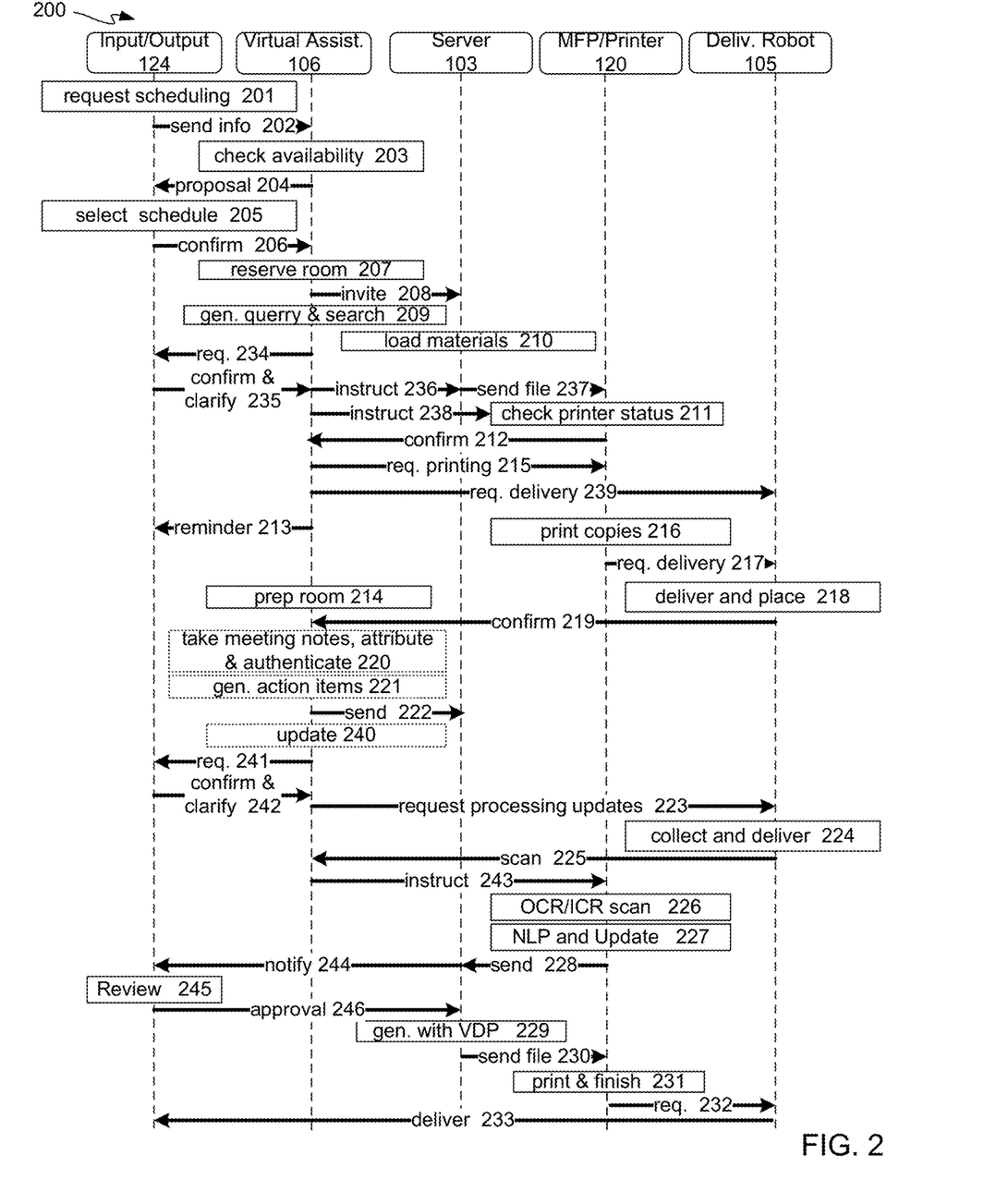
FIG. 2 is a flow diagram depicting an example of an integrated smart space flow.

FIG. 2 is a flow diagram depicting an example of an integrated smart space flow 200. Integrated smart space flow 200 may use components of smart space collaboration platform 100, including MFP 120, and so integrated smart space flow 200 is further described with simultaneous reference to FIGS. 1 and 2.

Prior to beginning integrated smart space flow 200, users and devices are registered to smart space web application 113 running on server 103. For example, for a cloud-based server, a cloud smart space web application 113 allows users to set certain rules/workflows for collaboration, sharing and automatic/intelligent processing.

In following example, multiple persona (user, Siri, printer, bot, delivery robot, AI sensor, and mailroom robot, among others) and multiple applications/systems (smart space web app, mail app, DMS/ECM system, variable data printing app, and ERP/CRM system, among others) are included in smart space collaboration platform 100.

A meeting can be arranged and hosted seamlessly in a smart space. At operation 201, a user may provide input 124, such as by voice command to request scheduling of a meeting. At operation 202, information associated with such a meeting may be automatically sent to virtual assistant 106. Such information may include an agenda, goal(s), reasons for a meeting, discussion and background materials, and/or other information, which may be manually and/or automatically retrieved and sent to virtual assistant 106 for such a meeting.

Virtual assistant 106, such as for example Siri, Alexa, Cortana, or Google, allows a user to make meeting arrangements by talking to a smart device having such a personal assistant. A user may specify people to invite, an agenda, goal(s), reason(s), purpose(s), discussion topics, and/or materials/hand-outs with instructions, such as customized and printed in a certain format, of/for such meeting.

At operation 203, virtual assistant automatically and remotely checks each attendees' calendar for their availability and checks availability of meeting rooms suitable for such meeting. At operation 204, virtual assistant 106 sends a recommendation or proposal for at least one date, time and location for a user to select. For example, a virtual assistant 106 may sent 2 to 3 possible recommended options from which a user can select an option. At operation 205, a user may select an option from a list of recommendations, and, at operation 206, a user may provide confirmation of such selection to virtual assistant 106.

Once confirmed, at operation 207, virtual assistant 106 reserves a confirmed meeting room, and at operation 208 sends out invitations. Such invitations may include a meeting agenda and goals. Such invitations may be sent electronically and/or may be mail-out, such as a personalize letter to customers or potential customers to inform them about some service, event, product, or other matter. Personalizing each letter with customer name, mailing address, and customer number.

Virtual assistant 106 at operation 207 can reserve an available conference room with proper facilities, such as enough seats, a white board, a projector, one or more AI sensors for sophisticated computer vision, speech modeling, body tracking, and speech recognition), room temperature, light, and/or other items. Along those lines, a developer's kit, such as for example AI Azure Kinect DK, may be used for providing one or more AI sensors of AI sensor system 102.

At operation 209, virtual assistant 106 may generate one or more queries and communicate with server 103 to search for and locate one or more documents to be used for such a meeting from a DMS/ECM system 111 on such server. A search query may be automatically structured based on keywords, metadata, date/time, and/or other information available to virtual assistant 106 about such meeting. Once located on a database of DMS/ECM system 111, such one or more documents and/or other materials may be loaded at operation 210 by server 103.

At 234, virtual assistant 106 may request a user to confirm loaded materials are correct and complete. This search, request and confirm cycle may be performed one or more times until all materials have been identified. Further, at operation 234, a virtual assistant 106 may request a user to clarify/confirm one or more print requirements, such as for example presentation style or memo style, duplex/simplex, color/mono, staple, any customization based on participants' responsibility and focus, addition of participant's name to proper context, and/or highlight one or more items for special attention, among others.

Once confirmed by a user at operation 235, virtual assistant 106 may search for available printers, check print capabilities (e.g., color/mono, staple, and/or toner level, among others.), and select a printer having capabilities and capacity for a print job for such a meeting. At operation 236, virtual assistant may instruct server 103 to send a file or files of materials identified for a meeting to MFP 120 for printing. In response, at operation 237, server 103 may send such loaded materials to MFP 120 for printing.

Further, at operation 238, virtual assistant 106 may communicate with a printer bot 122 and reserve a time for printing to prevent unexpected interruption, e.g. lack of paper, printer malfunction, low toner, temporary relocation, and/or other type of interruption. At operation 211, printer bot 122 may check the health state of MFP 120, and, if necessary, create a service/trouble ticket to instruct personnel to replace toner, refill a paper tray, and/or other maintenance. After completion at operation 238 to confirm a suitably capable printer is ready, MFP 120 may send a confirmation at operation 212 to virtual assistant 106.

In another example, once loaded at operation 210, materials for a meeting may be directly sent to MFP 120. At operation 211, a printer bot 122 may check MFP status without prompting from virtual assistant 106. Accordingly, in this example, operations 234 through 238 may be omitted.

In response to a confirmation and before a meeting, virtual assistant 106 at operation 215 may request printing, which request may be sent to MFP 120. In other words, before a meeting, virtual assistant 106 may initiate printing with proper print options. At operation 239, virtual assistant 106 may inform a delivery robot 105, which may be at the same office complex as a user, to pick up and deliver a completed print job to a smart space meeting room 110, such as a conference room. In another example, a print job may stay in a user's box of MFP 120, and delivery robot 105 may start/trigger printing by entering a user login code provided by virtual assistant 106 in a delivery request provided at 239.

In another example, operation 239 may be omitted. For example, printing at operation 216 may proceed immediately after checking printer status at operation 211. In this example, operations 212 and 215 may be omitted, and operation 239 may be omitted or retained in this example.

In an interval prior to a meeting, such as during printing, at operation 213 virtual assistant 106 may send a reminder to a user and invited attendees.

At operation 216, copies of documents and/or other materials may be printed by a selected MFP 120. Optionally, in an example, after completion of printing, at operation 217 MFP 120 may send a delivery or pickup request to delivery robot 105. For example, once documents and/or other materials are printed, stapled, and set in order, delivery robot 105 may at operation 218 deliver documents to smart space meeting room 110 and place such documents on a conference table in such order with sets of documents respectively personalized for attendees. After placement of documents, delivery robot 105 may send a confirmation at operation 219 of completion of such task to virtual assistant 106. This assume delivery robot 105 had access to smart space meeting room 110 before the start of such a meeting. If, however, delivery robot 105 does not have early access to smart space meeting room 110, then delivery robot 105 can wait by just inside by an entry door of smart space meeting room 110 and directly handout sets of documents to attendees as recognized by an AI sensor system in communication with delivery robot 105. In another example, a smart room robot 101-11 may accept delivery from delivery robot 105, and then delivery robot 105 may be made available while smart room robot 101-11 hands out and/or places document packages for attendees. A confirmation may be sent at operation 219 the earlier of once all sets of documents are handed out or sometime after the meeting has begun. Such confirmation may be sent by delivery robot 105.

Assuming smart space meeting room 110 is available for use prior to such meeting, at operation 214 virtual assistant 106 may prepare smart space meeting room 110. For example, virtual assistant 106 may turn on and adjust HVAC and room lighting to a specified setting. Otherwise, virtual assistant 106 may perform such adjustments immediately after such smart space meeting room 110 becomes available at the start of such a meeting.

Around the time of meeting time, as attendees start to enter smart space meeting room 110, one or more AI sensors of AI sensor system 102, such as of an AI Kinect system from Microsoft or the like, may recognize and greet people, such as with their name from a list of attendees and visual recognition. AI sensor system may inform each attendee location of their designated seat, where printed personalized documents for them were placed. Additionally, such an AI sensor system may record who attended such a meeting. Along those lines, using visual and audio information obtained on attendees at such a meeting by AI sensor system 102 may perform authentication of attendees prior to and during such meeting.

Once a meeting starts, virtual assistant 106 may take meeting notes at operation 220. AI sensor system 102 may use voice and/visual recognition files for each of the attendees for attribution of any statements made during a meeting. By comparing voice and/or visual recognition files on file for attendees with meeting gathered audio and image information, as gathered by AI sensor system 102 prior to and/or during a meeting. Such comparing may be used to generate identity information on those attendees' present, as well as those attendees speaking or making statements during a meeting.

Virtual assistant 106 may communicate with AI sensor system 102 to identify each person speaking during a meeting using identity information generated by AI sensor system 102. Furthermore, such identity information may be used by virtual assistant 106 to verify authenticity of attendees, as well as authorization to attend such meeting, such as by being on a list of invited guests or by confirmation from a user via user input/output 124 to allow such person to attend.

At operation 221, virtual assistant 106 may generate and summarize action items. Each attendee may write down personal notes and recommended updates to the handouts provided, which handouts may be left in smart space meeting room 110 for legal, security, or other reasons.

At operation 222, virtual assistant 106 may send meeting notes and action items to server 103, such as for DMS/ECM system 111, for each attendee. Optionally, such meeting notes and action items may be sent to each attendee by email or other form of electronic communication.

At operation 240, virtual assistant 106 may update documents or other meeting materials with reviewed notes from a meeting for printing out an updated version for providing to attendees and/or others. Each draft of an update by virtual assistant 106 may at operation 241 be requested to be reviewed by a user for final review and approval. A user may confirm or clarify such updates at operation 242 and provide such revision back to virtual assistant 106. This loop may repeat until a user final approves an updated version.

With confirmation of an approved update version, virtual assistant 106 may at operation 223 request processing of one or more updates. Along those lines, virtual assistant 106 may instruct delivery robot 105 to gather all printed materials handed or passed out at such meeting ("handouts" or "meeting handouts") left and/or handed in for scanning. At operation 224, delivery robot 105 may collect such handouts, and then after delivery of such collected handouts to an MFP 120 may at operation 225 inform virtual assistant 106 such documents have been delivered for scanning.

At operation 243, virtual assistant 106 may instruct printer bot 122 to analyze notes and make annotations, including attributions, and/or other changes. Printer bot 122 may use an embedded OCR/ICR subsystem 121 during a scanning operation 226 of such documents. Embedded apps 123 may be used for taking OCR/ICR processed documents to recognize notes and update or otherwise process such documents at operation 227 using one or more embedded language processing technologies provided by such embedded apps. Such embedded apps 123 may include following technologies: Natural Language Processing ("NLP"), Natural Language Understanding ("NLU"), and/or Natural Language Generation ("NLG"); generally, these technologies are respectively for processing, understanding, and generating.

At operation 228, printer bot 122 may send a final updated draft document to DMS/ECM system 111. Such updated materials may be recorded and stored in DMS/ECM system 111. At operation 224, a virtual assistant 106 may be notified of recording and uploading of such final draft document to DMS/ECM 111 to notify a user for final review and approval.

At operation 245, a user may review a final draft document in a digital format and approve on DMS/ECM system 111. At operation 246, a user may provide a final approval confirmation to DMS/ECM system 111 on server 103. At operation 229, a list of customers may be obtained for generation of personalized documents using a variable data printing ("VDP") app 117. There are other ways a customer list may be obtained. For example, a user may provide a list of customer information to virtual assistant 106; a server 103 may access such a list from EPR/CRM system 113, as in this example; or a user may provide a command to virtual assistant 106 to link to a customer database of EPR/CRM system 113.

In an example, a user may instruct virtual assistant 106 to print a final document with personalized information and mail each to customers on a customer list. In this example, server 103 is configured to automatically responsive to approval 246 obtain such customer list at operation 229, generated personalized documents for customers on such list using variable data printing at operation 229 of one or more updated documents generated at operation 227 and send such file or files for printing at operation 230 by MFP 120 at operation 231. In another example, virtual assistant 106 may initiate printing using VDP app 117.

VDP app 117 may be used to generate personalized documents with customer information (e.g., name, mailing address, and/or customer/policy numbers, among other items). VDP app 117 may be used to print out a document for each customer, print out a corresponding envelope with mailing address and barcode (e.g., for postage), and instruct finisher to fold letters, insert same into envelopes, and seal such envelopes.

Once completed, MFP 120 as in this example may send a request at operation 232 for a delivery robot 105 or a mailroom robot 104 to pick up and deliver such sealed envelopes to a mailroom. In another example, a virtual assistant 106 may be informed by MFP 120 or VDP app 117 of completion of printing and finishing operation 231, and virtual assistant 106 may request robotic retrieval and delivery of seal envelopes to a mailroom.

Once delivered, at operation 233 a robot 104 or 105 may send a notification to virtual assistant 106 of completion of such delivery. In a mailroom, a mailroom robot 104 receiving letters, may stamp same with appropriate postage informed by barcode information and process such mail for mailing or shipping.

Once such shipping process is over, mailroom robot 104 in another example may send a notification at operation 233 to virtual assistant 106 of such completion. Such notification may include a receipt or an invoice for such shipping costs.

A virtual assistant 106 may notify a user about such completion of entire task and send such shipping/mailing receipt/invoice to ERP/CRM system 114 for processing.

The above-described scheduling request may be started from anywhere having connectivity, including from home, an office, in-transit, a virtual office, or other location. As an option, we can start process from home to prepare for the meeting during driving. Furthermore, before a meeting, a virtual assistant 106 may remind a user of an upcoming meeting and inform such user of travel time. For travel by automobile, a virtual assistant 106 may order a car and provide addresses and other information for such order. For a self-driving car, virtual assistant 106 may additionally provide information to prepare such car's environment, such as turning on AC or heat and providing a local or national news feed for example.

Figure 3:
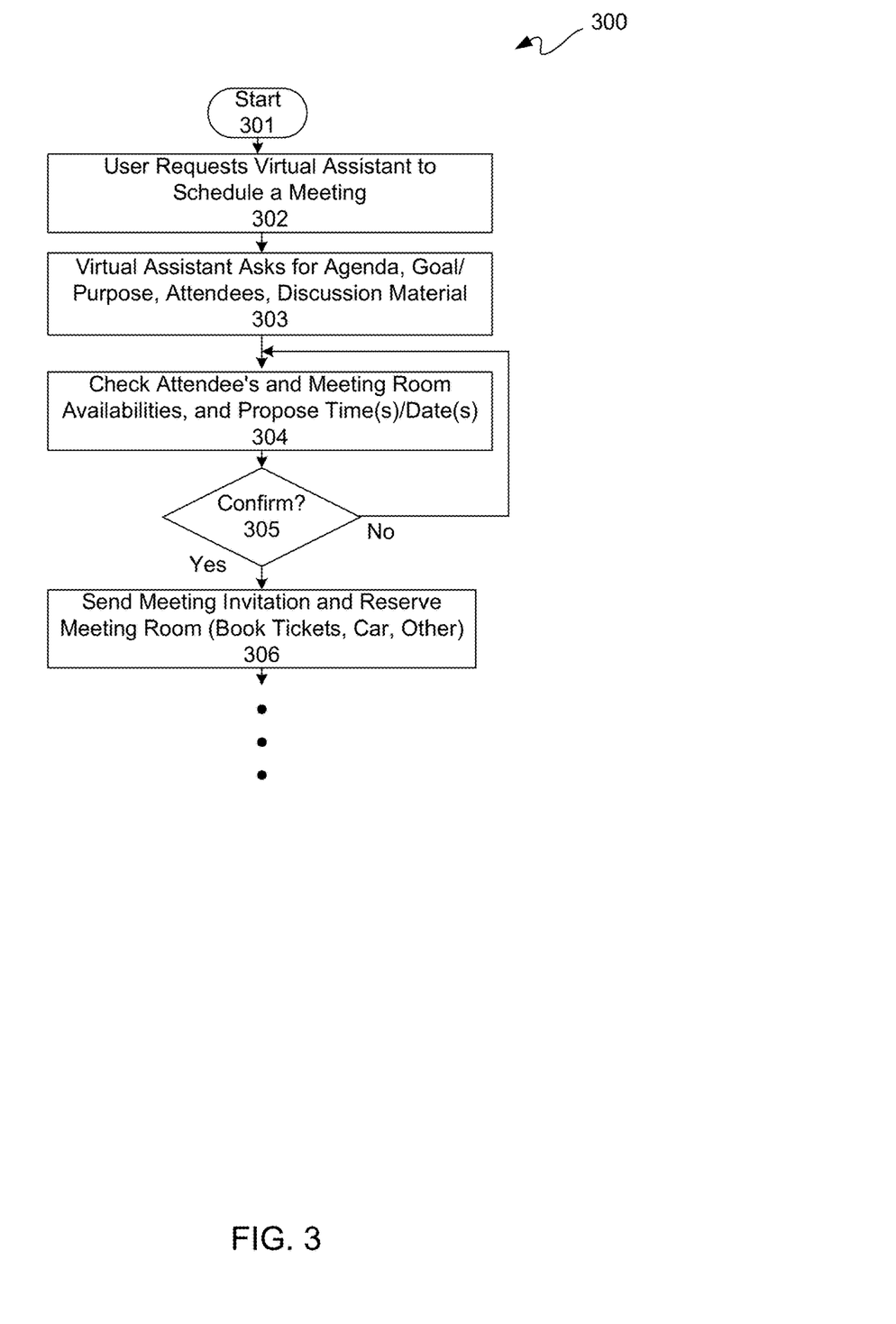
FIG. 3 is a flow diagram depicting another example of an integrated smart space flow.

FIG. 3 is a flow diagram depicting an example of an integrated smart space flow 300. As much of integrated smart space flows 200 and 300 are the same, generally only differences are described in detail to avoid repetition for purposes of clarity and not limitation. Integrated smart space flow 300 is further described with simultaneous reference to FIGS. 1 through 3.

Integrated smart space flow 300 may be started at operation 301, such as invoking a listening mode for a virtual assistant 106. At operation 302, a user may request virtual assistant 106 to schedule a meeting.

At operation 303, a virtual assistant may ask a user for an agenda, goal/purpose, attendees, and discussion material for such meeting. At operation 304, a virtual assistant 106 may check availability for attendees and suitable smart meeting rooms.

At operation 305, a virtual assistant 106 may seek confirmation for attendance by each attendee. If an attendee cannot attend whose attendance is required for such meeting, operation 304 may be repeated, until at operation 305 all required attendees have confirmed.

If at operation 305 all required attendees have confirmed, then at operation 306 virtual assistant 106 may send meeting invitations and reserve a smart meeting/conference room. Additionally, if a reservation or booking of airplane, train, car, hotel, meeting equipment, and/or other goods or services may be needed for such meeting, at operation 305 virtual assistant 106 may make such bookings and/or reservations.

After operation 306, operations starting with operation 209 may be repeated, or variants thereof, as previously described and not repeated.

Because one or more examples described herein may be implemented in an information processing system, a detailed description of examples of each of a network (such as for a Cloud-based SaaS implementation), a computing system, a mobile device, and an MFP is provided. However, it should be understood that other configurations of one or more of these examples may benefit from technology described herein.

Figure 4:
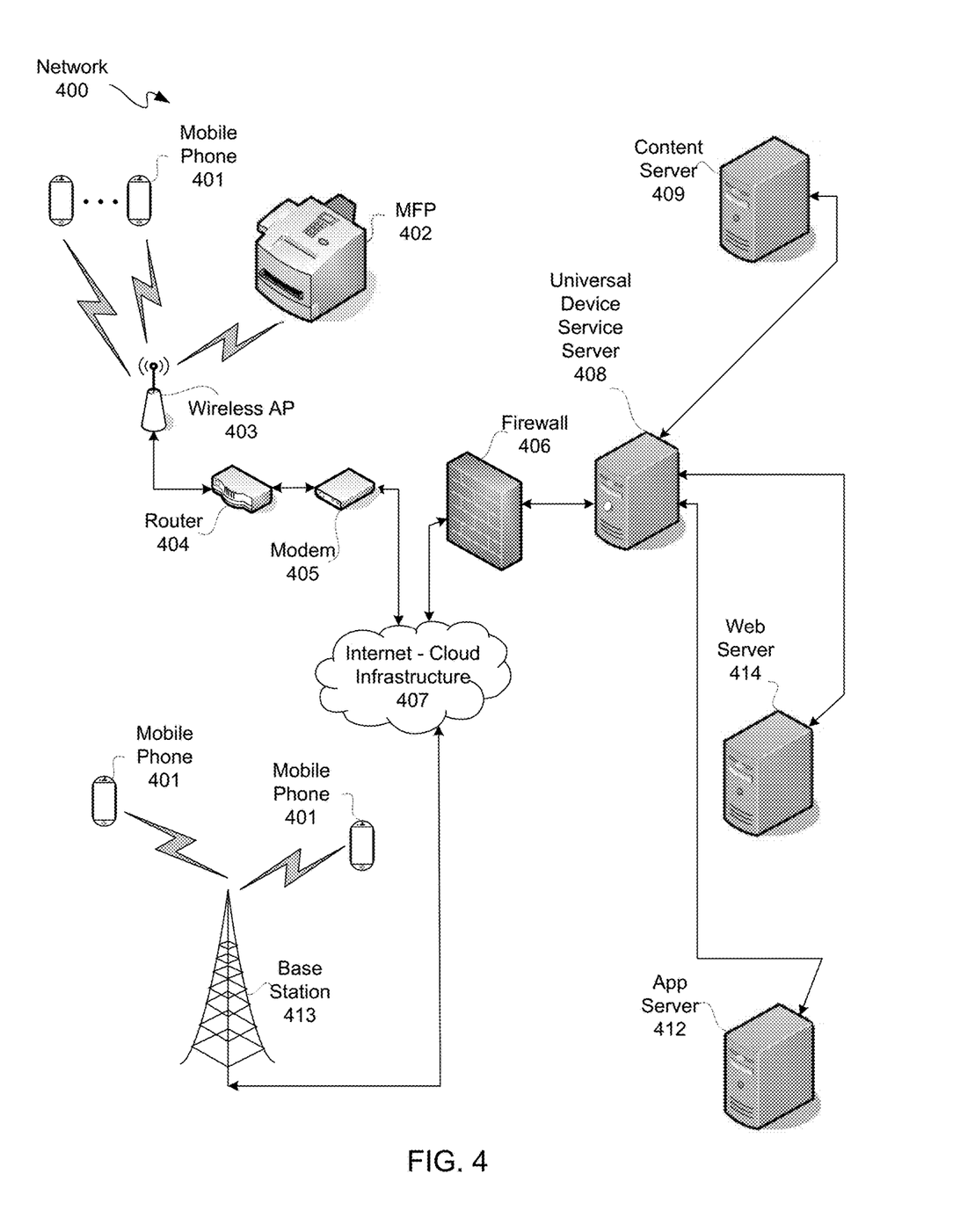
FIG. 4 is a pictorial diagram depicting an example of a network.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to a wireless router. Furthermore, one or more of such web-usable wireless devices 401 may be in wireless communication with a base station 413. Additionally, a desktop computer and/or a printing device, such as for example a multi-function printer ("MFP") 402, each of which may be web-usable devices, may be in wireless and/or wired communication to and from router 404.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figure 5:
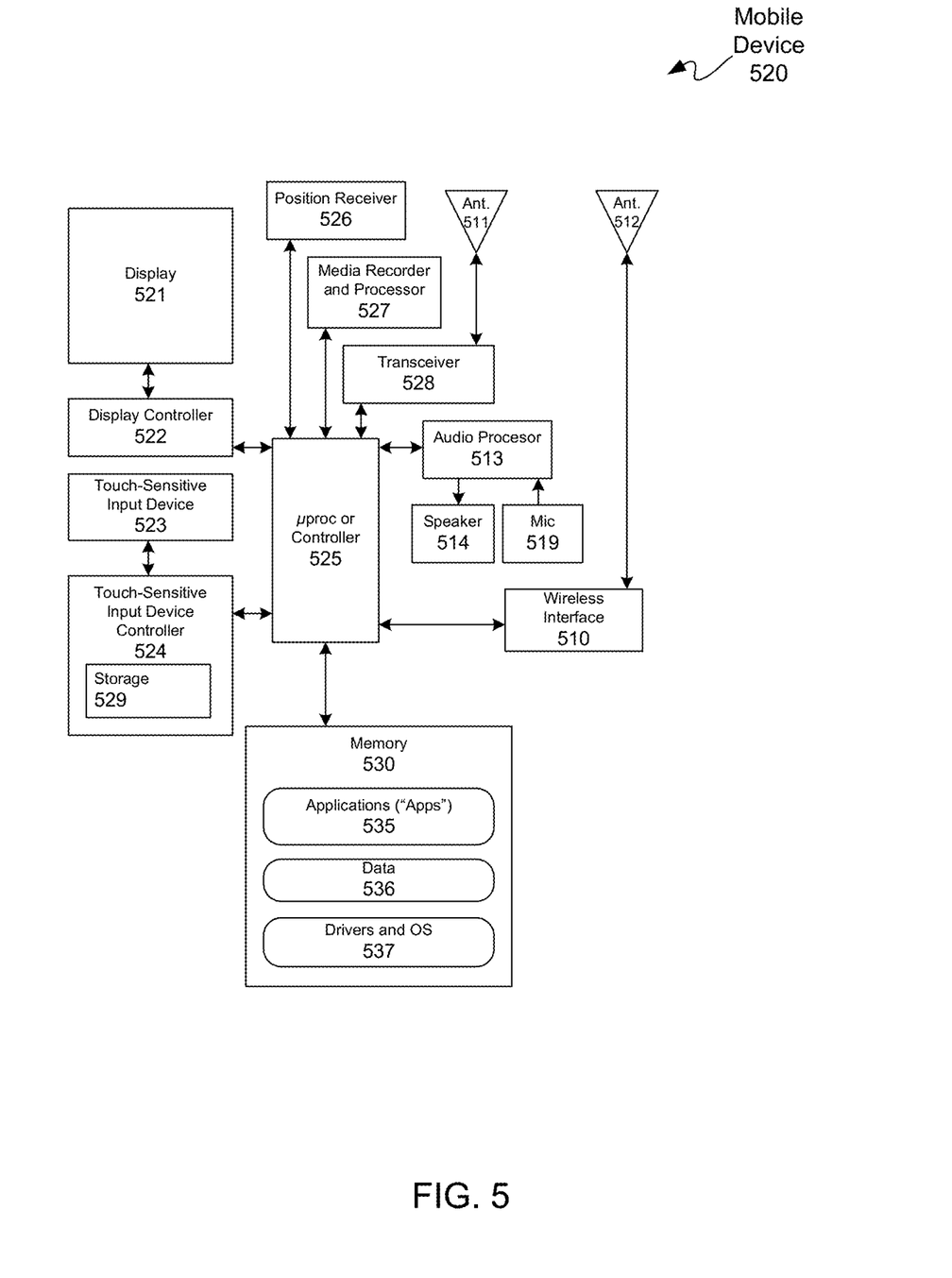
FIG. 5 is block diagram depicting an example of a portable communication device.

FIG. 5 is block diagram depicting an example of a portable communication device ("mobile device") 520. Mobile device 520 may be an example of a mobile device that may be used for communicating with a printing device, as described herein.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps as described hereinabove may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data.

I/O device drivers may include software routines accessed through microprocessor or microcontroller 525 or by an OS stored in memory 530. Apps to communicate with devices, such as touch-sensitive input device 523, keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly to touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera, a video camera, an audio recorder, or the like, to capture digital pictures, audio and/or video. Microprocessor or microcontroller 525 may be interconnected for interfacing with media recorder and processor 527. Image, audio and/or video files corresponding to pictures, songs and/or videos may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
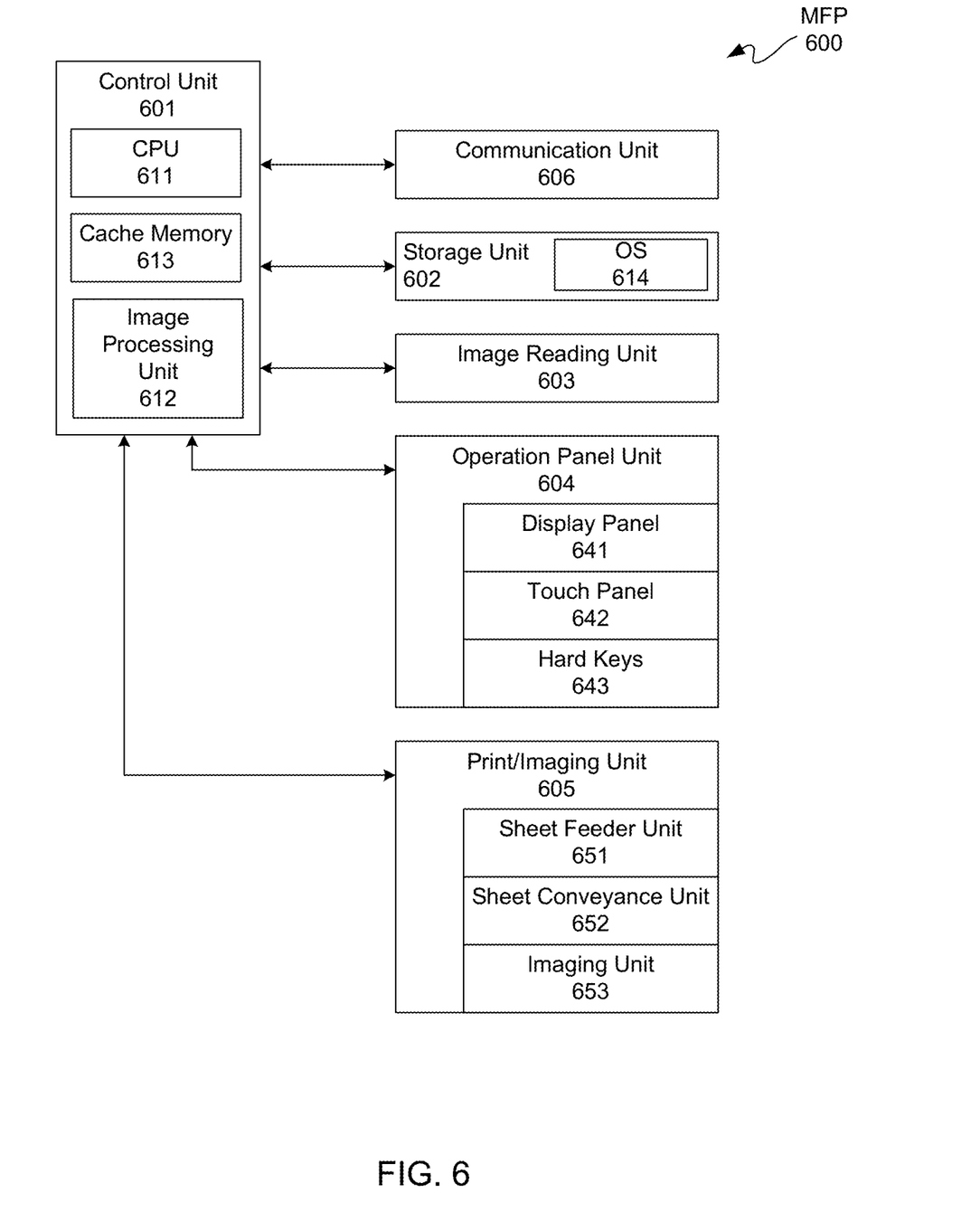
FIG. 6 is a block diagram depicting an example of a multi-function printer (MFP).

FIG. 6 is a block diagram depicting an example of a multi-function printer (MFP) 600. MFP 600 is provided for purposes of clarity by way of non-limiting example. MFP 600 is an example of an information processing system such as for handling a printer job as previously described.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Control unit 601 may be included with, or separate from, other components of MFP 600. Storage unit 602 may include ROM, RAM, and large capacity storage memory, such as for example an HDD or an SSD. Storage unit 602 may store various types of data and control programs, including without limitation an operating system 614 and other software for such MFP 600, such as bot software, OCR/ICR software, and NLP software. A buffer queue may be located in cache memory 613 or storage unit 602. Image processing unit 612 may include a RIP and other firmware of MFP 600.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
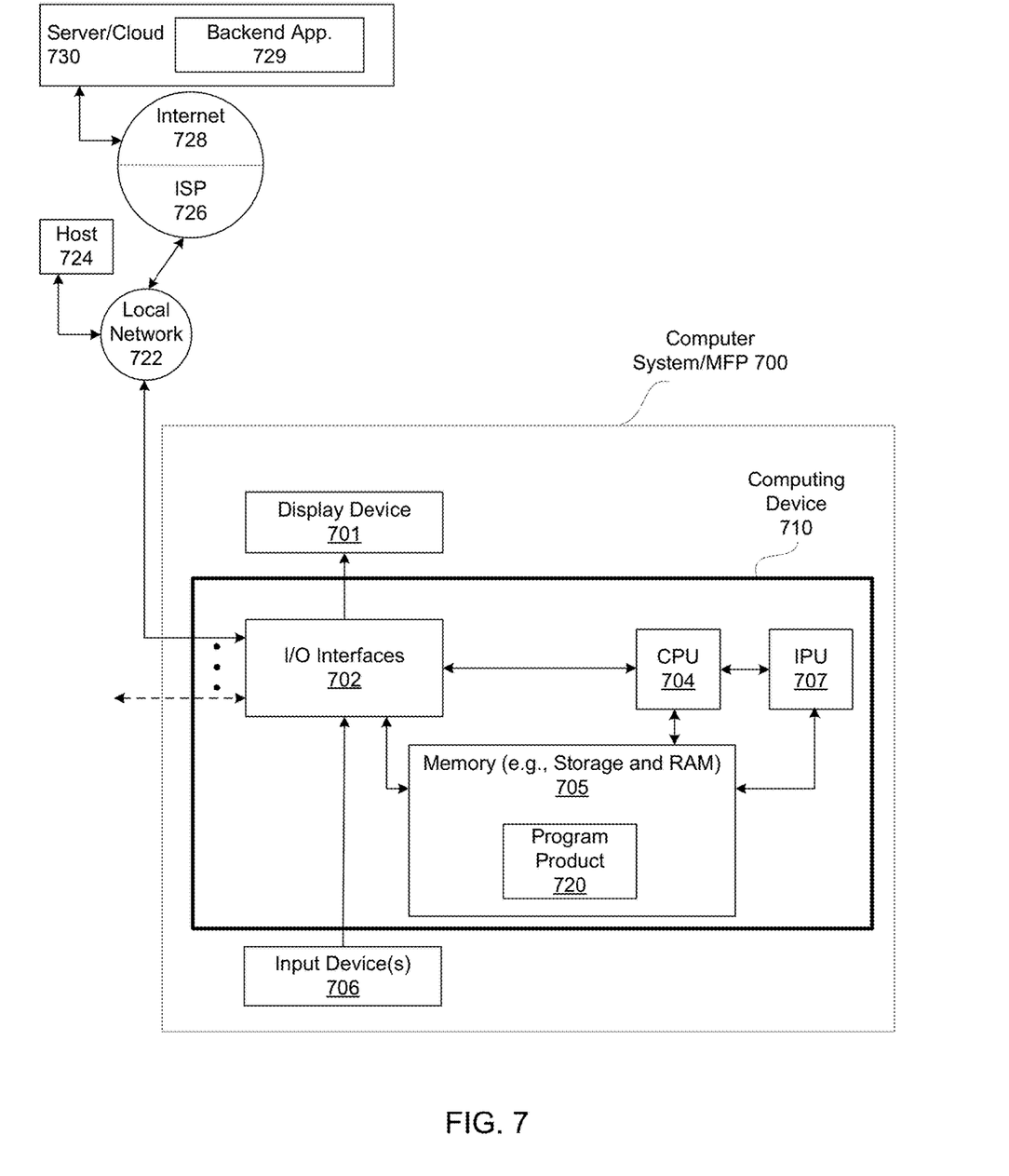
FIG. 7 is a block diagram depicting an example of a computer system.

FIG. 7 is a block diagram depicting an example of a computer system 700 upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used, and computer system 700 may be implemented as an MFP 700. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of sequences of instructions contained in main memory may cause CPU 704 to perform one or more process steps described herein. In alternative implementations, hardwired circuitry may be used in place of or in combination with software instructions for such implementations. Thus, example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines, the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load such instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long-range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in form of a carrier wave.

While the foregoing describes exemplary apparatus(es) and/or method(s), other and further examples in accordance with one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for integration of a printing device to a smart space meeting room, comprising:
    receiving by a virtual assistant of a user device a request to schedule a meeting;
    obtaining by the virtual assistant a list of attendees;
    determining availability of both attendees on the list of attendees and the smart space meeting room by the virtual assistant;
    confirming the availability of the attendees by the virtual assistant;
    reserving the smart space meeting room by the virtual assistant;
    sending invitations to each of the attendees by the virtual assistant;
    generating a query by the virtual assistant for searching a content management system on a server;
    locating by the virtual assistant materials on the content management system for the meeting;
    loading the materials by the server from the content management system;
    sending the materials from the server to the printing device;
    checking status of the printing device by a bot thereof;
    printing by the printing device the materials personalized to each of the attendees; and
    requesting by the virtual assistant a pick-up of the printed materials by a robot for delivery to the smart space meeting room reserved for the meeting.

2. The method according to claim 1, further comprising:
    delivering by the robot the printed materials to the smart space meeting room;
    confirming by the robot to the virtual assistant delivery of the printed materials to the smart space meeting room; and
    adjusting environment of the smart space meeting room responsive to instruction from the virtual assistant in preparation for the meeting.

3. The method according to claim 2, further comprising taking notes by the virtual assistant during the meeting.

4. The method according to claim 3, further comprising:
    summarizing the notes by the virtual assistant; and
    generating action items by the virtual assistant from the notes.

5. The method according to claim 4, further comprising sending the notes and the action items to the content management system for each of the attendees.

6. The method according to claim 5, further comprising updating the materials with the notes by the virtual assistant.

7. The method according to claim 6, further comprising gathering visual and audio information on the attendees by an artificial intelligence ("AI") sensor system of the smart space meeting room.

8. The method according to claim 7, further comprising:
comparing by the AI sensor system the visual and audio information gathered to visual and audio records for the attendees to provide identity information; and
adding attribution to the notes by the virtual assistant using the identity information.

9. The method according to claim 8, further comprising applying the identity information to the list of attendees for authenticating the attendees.

10. The method according to claim 6, further comprising:
requesting the robot by the virtual assistant to collect the printed materials from the smart space meeting room;
collecting the printed materials by the robot; and
delivering the printed materials by the robot to the printing device.

11. The method according to claim 10, further comprising:
instructing the bot of the printing device to scan the printed materials to provide updated materials; and
scanning the printed materials by the printing device using at least one form of character recognition embedded in the printing device to provide the updated materials.

12. The method according to claim 11, further comprising language processing the printed materials using the at least one form of character recognition to provide the updated materials.

13. The method according to claim 12, wherein the language processing comprises at least one of Natural Language Processing ("NLP"), Natural Language Understanding ("NLU"), or Natural Language Generation ("NLG").

14. The method according to claim 12 further comprising:
sending the updated materials by the bot from the printing device to the content management system on the server;
recording the updated materials in the content management system; and
notifying the virtual assistant by the content management system of the updated materials therein.

15. The method according to claim 14, further comprising:
obtaining a list of customers by the server from a planning-relationship system thereon; and
generating personalized materials by the server from the updated materials for customers on the list of customers.

16. The method according to claim 15, further comprising:
sending the personalized materials from the server to the printing device; and
printing the personalized materials by the printing device.

17. The method according to claim 16, further comprising controlling the printing device with a variable data printing app on the server for the printing of the personalized materials.

18. The method according to claim 17, wherein the content management system is selected from a document management system or an enterprise content management system.

19. The method according to claim 17, wherein the planning-relationship system is selected from an enterprise resource planning system or a customer relationship management system.

20. The method according to claim 17, wherein the user device having the virtual assistant is selected from a mobile phone, a smart speaker, a notebook computer, or a tablet.

* * * * *